G. DOKTER.
MOTOR SLEIGH.
APPLICATION FILED FEB. 9, 1910.
964,002.
Patented July 12, 1910.
5 SHEETS—SHEET 5.
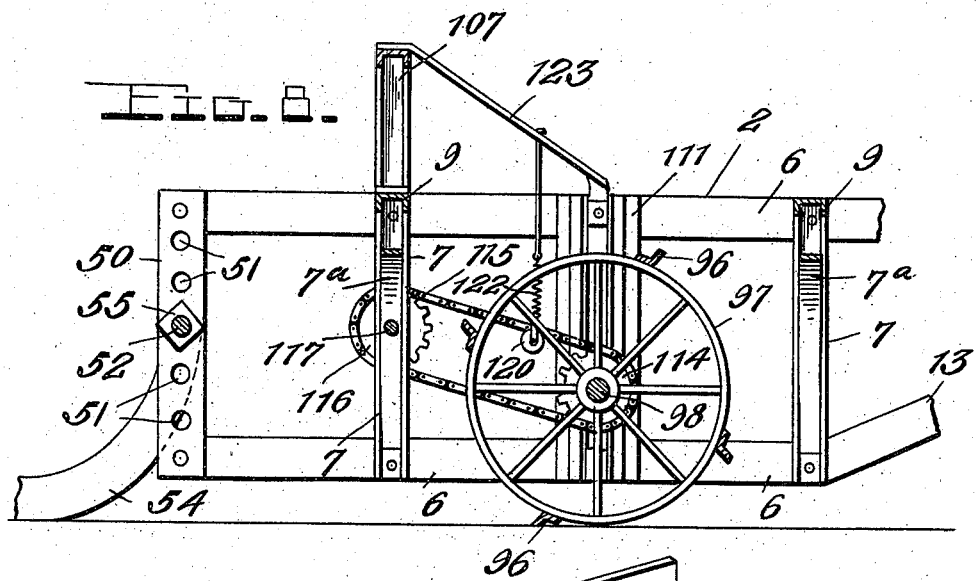
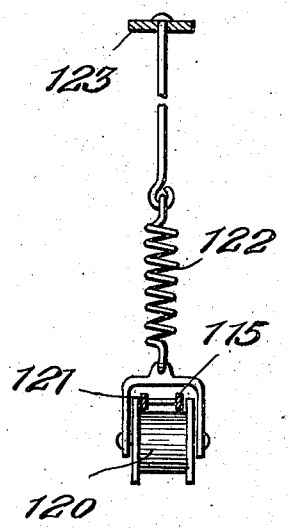
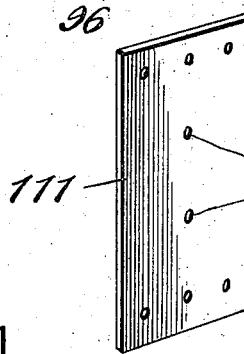
Witnesses
Chas. L. Griesbauer.
E. M. Ricketts
Inventor
Gay Dokter;
By Watson E. Coleman
Attorney

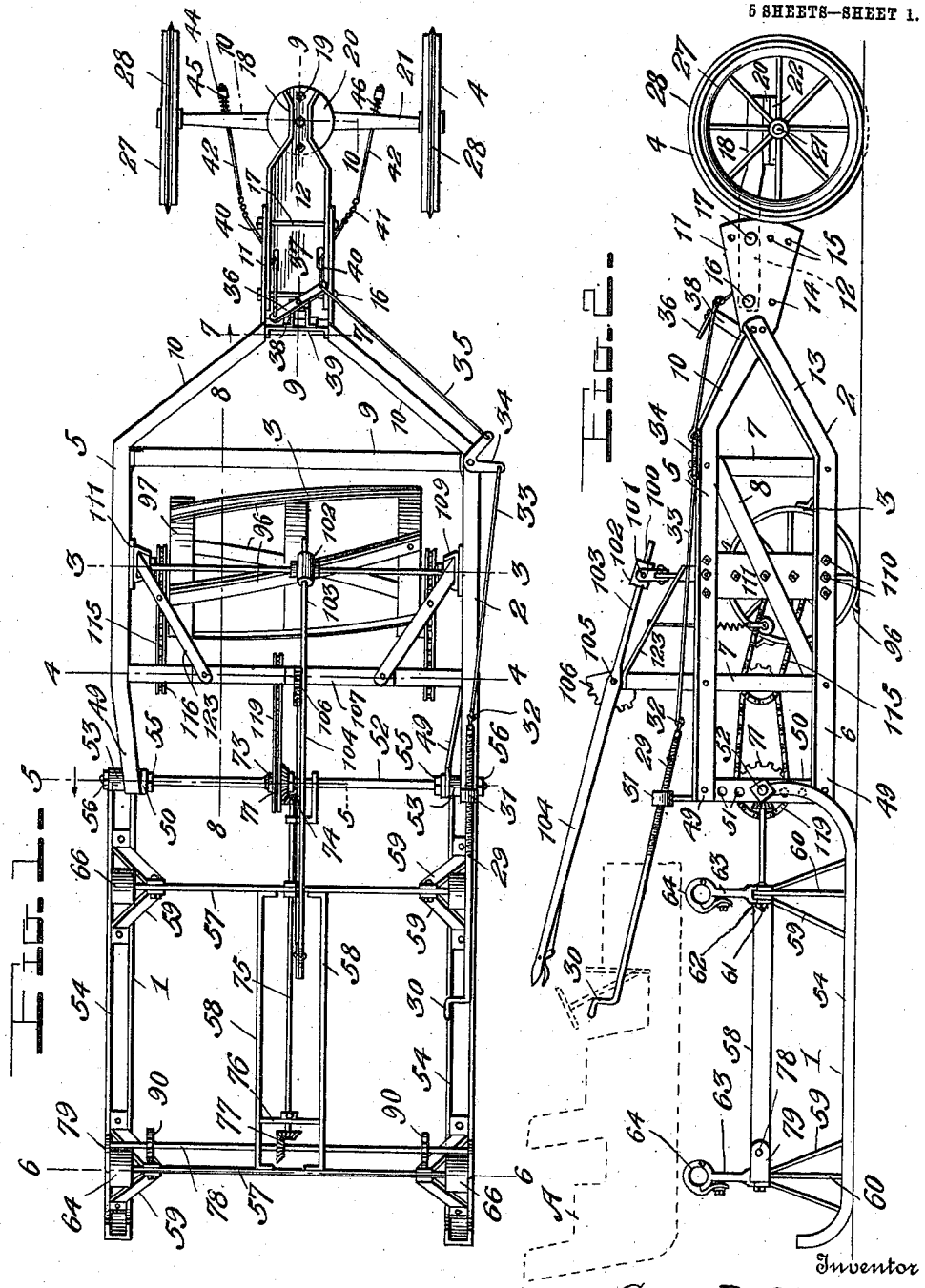

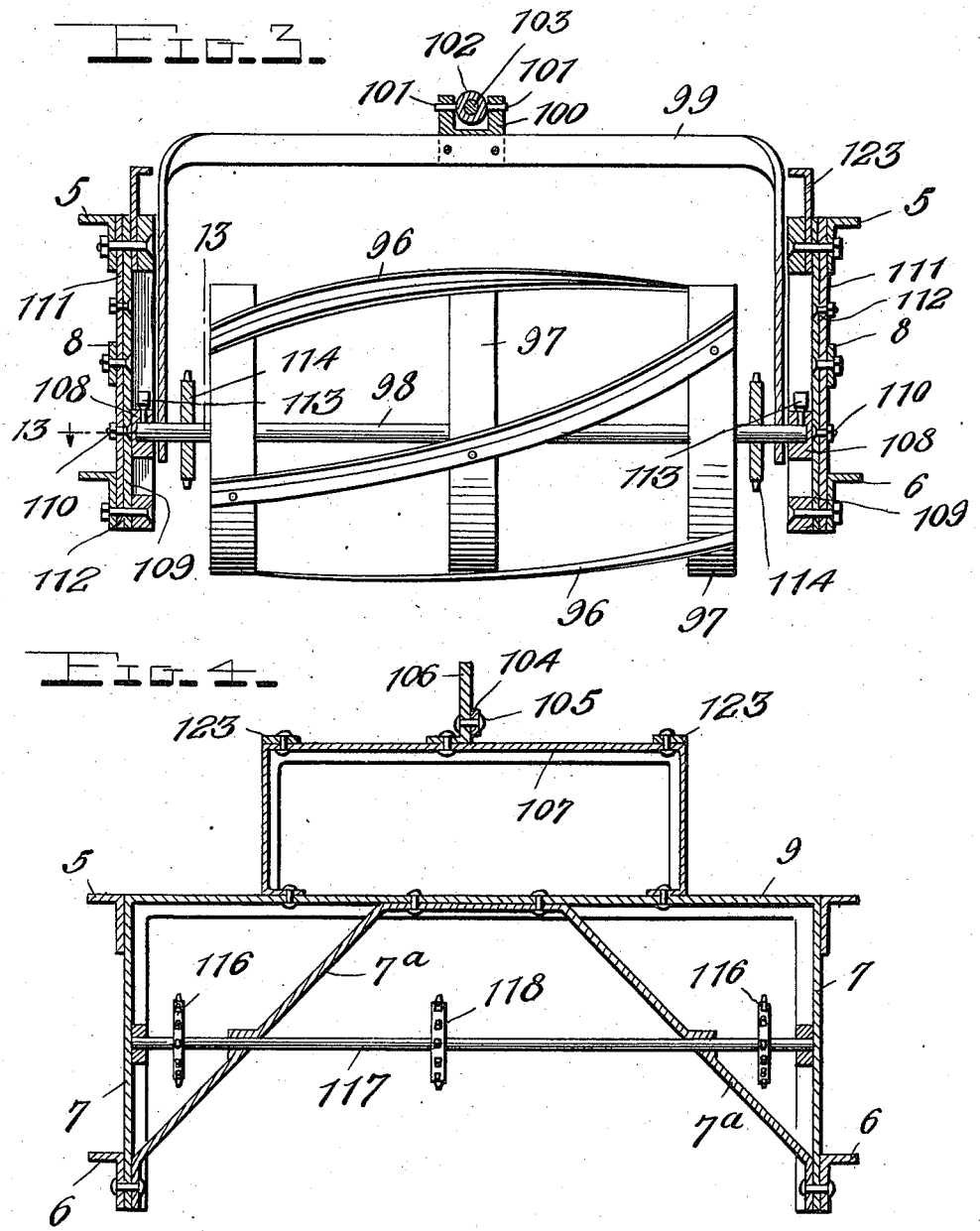

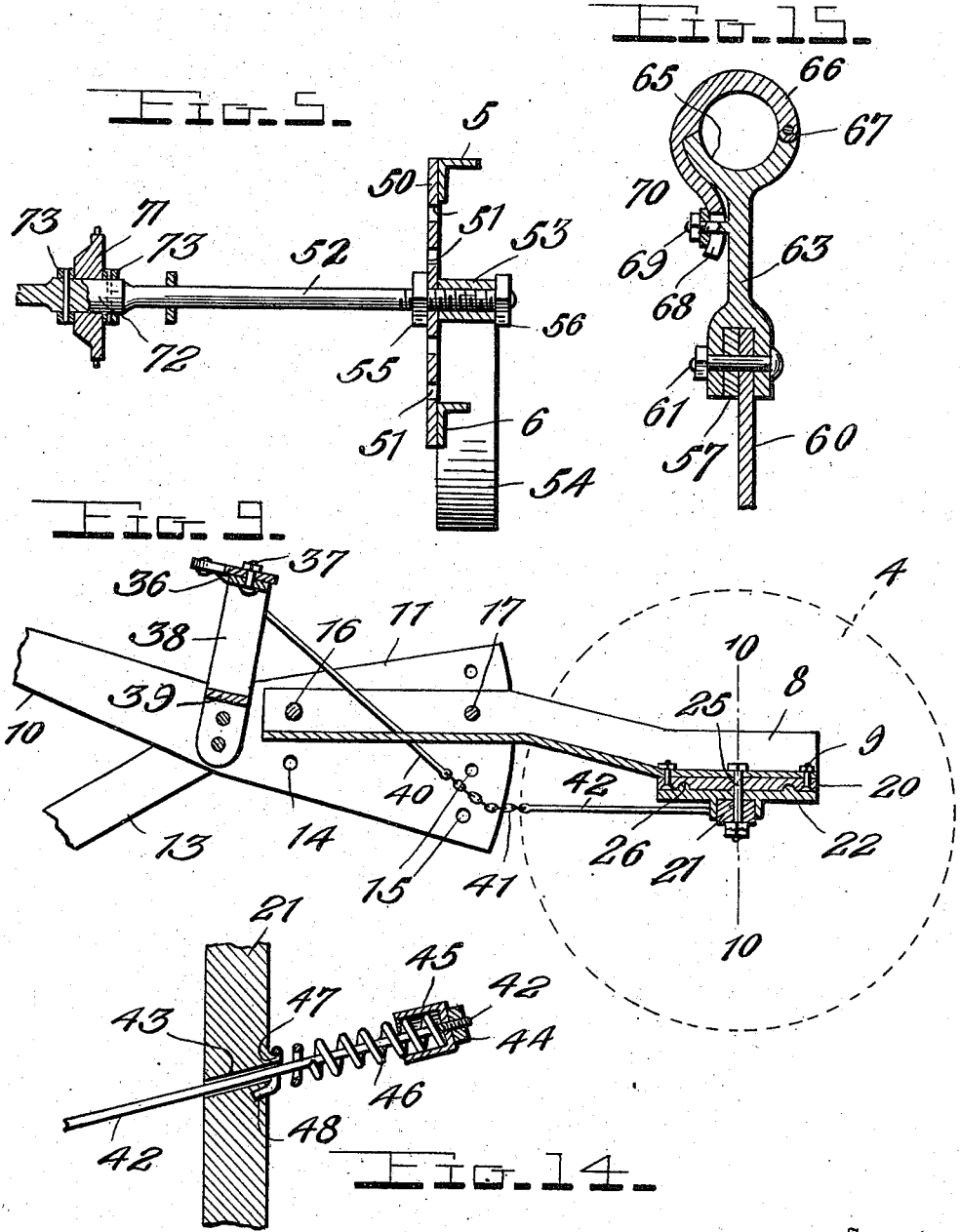

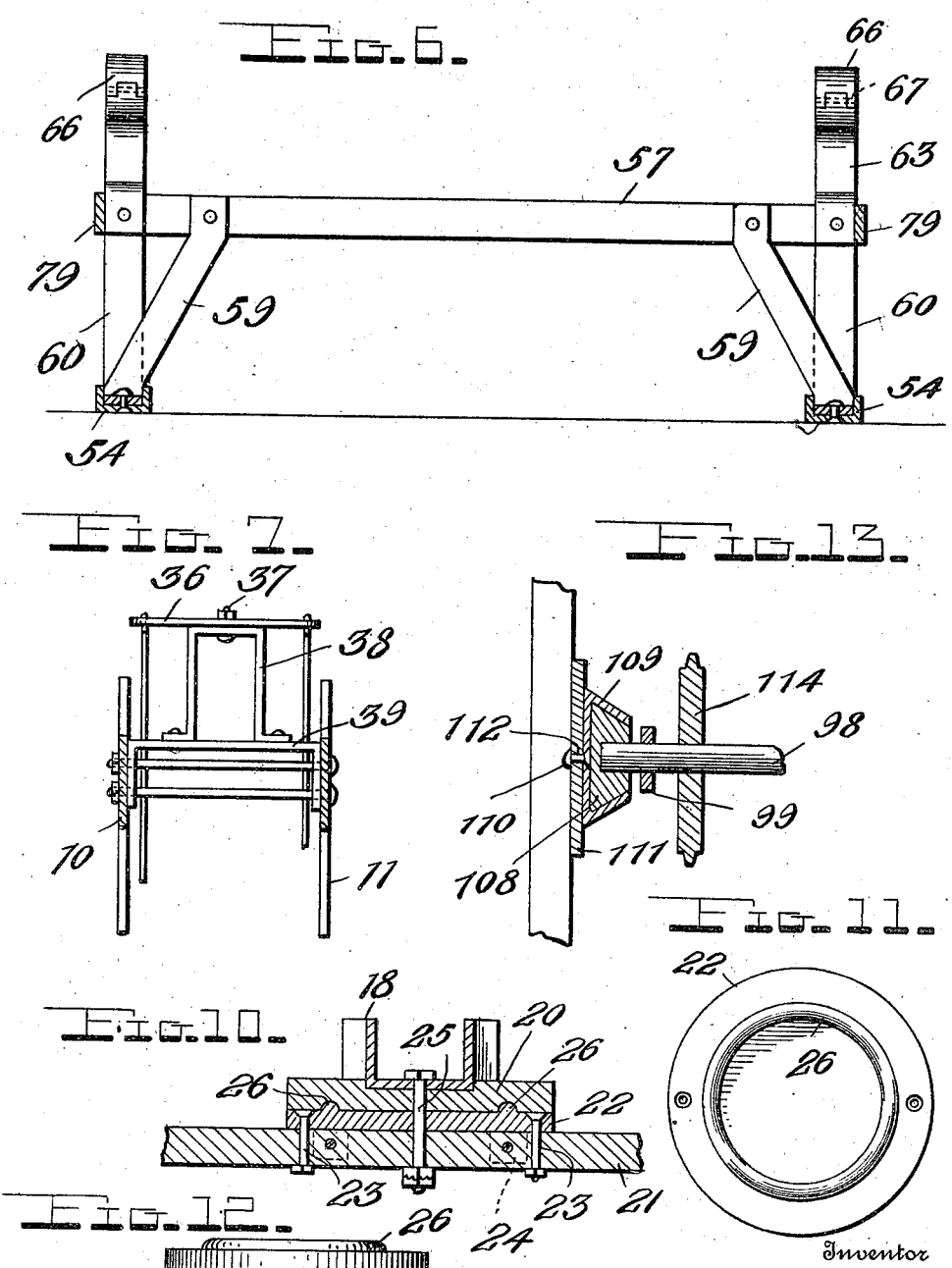

UNITED STATES PATENT OFFICE.

GUY DOKTER, OF ANDOVER, SOUTH DAKOTA.

MOTOR-SLEIGH.

964,002.   Specification of Letters Patent.   Patented July 12, 1910.

Application filed February 9, 1910. Serial No. 542,994.

*To all whom it may concern:*

Be it known that I, GUY DOKTER, a citizen of the United States, residing at Andover, in the county of Day and State of South Dakota, have invented certain new and useful Improvements in Motor-Sleighs, of which the following is a specification, reference being had to the accompanying drawings.

My invention relates to improvements in motor-propelled sleighs, and more particularly to a device or attachment which may be used in connection with an automobile or motor-propelled vehicle whereby the motor of the automobile may be used for propelling the sleigh and its body used for holding the operator, occupants and load.

The object of the invention is to provide a device of this character which will be simple, durable and comparatively inexpensive in construction, which will be easy to control and operate, and to which an automobile of ordinary construction may be readily applied and as readily removed without much, if any alteration in the construction of the automobile.

With the above and other objects in view, the invention consists of the novel construction, combination and arrangement of parts, hereinafter fully described and claimed, and illustrated in the accompanying drawings, in which:—

Figure 1 is a plan view of my improved motor sleigh; Fig. 2 is a side elevation of the same, an automobile being indicated in dotted lines; Figs. 3, 4, 5, 6 and 7, are detail vertical cross sectional views taken on the lines 3—3, 4—4, 5—5, 6—6 and 7—7, in Fig. 1; Figs. 8 and 9 are detail vertical longitudinal sectional views taken respectively on lines 8—8 and 9—9 in Fig. 1; Fig. 10 is a detail section through the central portion of the front axle, the fifth wheel and the reach; Fig. 11 is a plan view of the upper member or plate of the fifth wheel; Fig. 12 is an edge view of the lower member or plate of the same; Fig. 13 is a detail horizontal section taken on the line 13—13 in Fig. 3; Fig. 14 is a detail section through a portion of the front axle and showing the tension device for the connections which control said axle; Fig. 15 is a detail vertical section through one of the clamping devices which receive the axles of the automobiles; Fig. 16 is a perspective view of one of the upright side plates on the frame or carrier of the propeller wheel; Fig. 17 is a detail view showing one of the tension devices for the sprocket chains which actuate the propeller; and Fig. 18 is a detail view showing a modified form of driving mechanism, by means of which the invention may be connected to the power shaft of the automobile.

My invention comprises a sleigh 1 on which is removably mounted an automobile or other power-propelled vehicle indicated at A in Fig. 2, a frame or carrier 2 containing a propeller wheel 3 and arranged in advance of the sleigh having its rear end connected to the latter, and steering wheels 4 adapted to support the front end of the frame or carrier 2 as well as guide the same. The frame or carrier 2 is preferably constructed of upper and lower angle metal side bars 5, 6, united by uprights 7, diagonal braces 8 and horizontal connecting bars 9. The uprights 7 and bars 9 are preferably formed from channel metal of U-shape in cross section and in one piece as more clearly shown in Fig. 4; and the parts 7, 9, may be strengthened and united by diagonal braces 7ᵃ formed from a single bar of metal as shown in said figure. The forward ends of the upper side bars 5 converge inwardly and downwardly as at 10 and terminate in vertically disposed, forwardly projecting, enlarged segmental shaped plates 11 between which latter is adjustably mounted a reach bar or member 12. The forward ends of the lower side bars 6 converge upwardly and inwardly as at 13 and are united to the portions 10 of the bars 5, as shown in Fig. 2.

The reach 12 is preferably in the form of a channel bar or plate of U-shape in cross section and having upstanding flanges formed adjacent their rear ends with transverse openings adapted to be moved into register with series of openings 14, 15, formed in the plates 11, whereby transverse bolts 16, 17, may be arranged in said registering openings to adjustably unite the reach 12 to the frame or carrier 2. I preferably provide four of the openings 15 and two of the openings 14, the said openings being so arranged that when the bolt 16 is inserted in the lowermost opening 14 the bolt 17 may be inserted in either of the two lowermost openings 15, and likewise when said bolt 16 is inserted in the upper opening 14 the bolt 17 may be inserted in either of the two uppermost openings 15.

The forward extremity of the reach 12 has a contracted portion 18 which is secured by bolts 19 in a suitably shaped recess in the top of the upper plate 20 of the fifth wheel of the axle 21 which carries the supporting and steering wheels 4. This fifth wheel has a lower plate 22 which is secured by bolts 23 to the axle 21 and which has upon its bottom spaced ribs 24 which receive said axle between them. A king bolt 25 passes through the reach, the fifth wheel plates 20, 22, and the axle 21 to pivotally unite said parts, as shown in Fig. 10. To remove the strain from the king bolt 25 the lower plate 22 has formed on its upper surface an annular rib 26 which is concentric with the king bolt and which enters an annular groove formed in the bottom face of the upper plate 20.

The wheels 4 may be of any suitable form and construction and have annular rims 27 provided with metal tires from which project centrally arranged annular ribs 28 which are tapered or of V-shape in cross section, as will be understood on reference to Fig. 1. These ribs 28 enter the snow or ice over which the machine travels and prevent slipping or skidding.

For the purpose of swinging the axle 21 to steer the machine I provide a screw shaft 29 disposed to one side of the frame 2 and having at its rear end a crank handle 30 which is arranged within reach of the occupant of the automobile A. The shaft 29 has a threaded portion working in a threaded opening or nut formed in the upturned rear end 31 of one of the side bars 5, and the forward end of said screw shaft 29 has a swivel connection 32 with a link 33. The latter is connected to one arm of a bell crank 34, the other arm of which is connected by a link 35 to one end of a diagonally arranged lever 36 fulcrumed at its center at 37 on the top of a U-shaped bracket 38 which is arranged in a forwardly inclined position on the top of a U-shaped cross bar 39 secured between the plates 11, see Figs. 1, 7 and 9. Connected to the two ends of the lever or cross bar 36 are links 40 which pass through openings in the reach bar 12, and which are connected by chains or other flexible connections 41 to link rods 42, the forward ends of which latter project through and slide in angularly arranged openings 43 formed in the axle 21. On the forward extremities of the link rods 42 are nuts 44 and cup-shaped washers 45, which latter receive the forward ends of coil springs 46 arranged on the link rods 42, as shown in Figs. 1 and 14. The rear ends of the coil springs 46 engage lugs 47 formed on the axle 21 on one side of the openings 43, and said extremities of the spring also enter sockets 48 formed in the axle 21 on the opposite side of said openings 43, see Fig. 14.

It will be noted that this spring or tension device will provide a yieldable connection between the axle and the cross bar or lever 36 so that when said lever is rocked the axle 21 will be correspondingly rocked, but at the same time should any obstruction be in the way of the wheels 4, said connections will not break. It will be further noted that the lever 36 is diagonally arranged so that movement of the link 35 in either direction from its normal position shown in Fig. 1 will cause a corresponding movement of the axle 21 in either direction.

The rear ends of the upper and lower side bars 5, 6, are offset inwardly as shown at 49 and are united by upright bars 50 formed with vertical series of openings 51 in any one of which may be positioned a horizontal transverse connecting rod or shaft 52. The extremities of the rod 52 are arranged in eyes 53 formed on the upturned forward ends of the runners 54 of the sleigh 1, and said extremities are also screw threaded to receive inner and outer nuts 55, 56, between which the bars 50 and eyes 53 are securely clamped. Owing to the provision of the series of openings 51 it will be seen that the rear end of the frame 2 may be supported at any desired elevation with respect to the sleigh 1.

The sleigh 1 consists of the two runners 54, preferably made of channel metal bars of U-shape in cross section, their channel faces turned upwardly and both their front and rear extremities rounded as shown in Fig. 2 so that the device may be propelled in either direction. The body portion of the sleigh 1 consists of front and rear cross bars 57, united by spaced longitudinal bars 58. The bars 57 have their end portions secured between the upwardly and inwardly converging upper ends of brace bars 59, the lower ends of which latter are secured in the channels of the runners 54, see Fig. 1. The outer extremities of the bar 57 are also united to the upper ends of uprights 60, which latter also rise from the runners 54 and are disposed centrally between the braces 59. The connection between each upright 60 and its bar 57 is effected by a transverse bolt 61, which latter also serves to unite to said parts the forked lower end 62 of a standard 63. The four standards 63 carry at their upper ends clamps 64 for the reception of the axles of the automobile A, each of said clamps consisting of a stationary sleeve section 65 formed on the upper end of the standard 63, and a swinging sleeve section 66 pivoted at 67 to one side of the section 65. The other or free end of the swinging section 66 is formed with a curved and slotted tongue 68 adapted to receive a screw stud 69 formed on the standard 63 and to be retained thereon by a clamping nut 70 as will be understood on reference to Fig. 1. Owing to this construction it will be seen that an automobile of ordinary construction may be readily applied to or removed from the sleigh 1.

The propeller wheel 3 is adapted to be actuated from a rotary driving element 71 in the form of a combined sprocket wheel and beveled gear loosely mounted on an enlarged central portion 72 of the rod or shaft 52 between stop collars 73, as clearly shown in Fig. 5. The beveled gear of the wheel 71 meshes with a beveled pinion 74 on the forward end of a longitudinal shaft 75 journaled in suitable bearings in the front bar 57 and in a cross bar 76 arranged between the longitudinal bars 58. The rear end of the shaft 75 is connected by bevel gearing 77 to a transverse shaft 78 journaled in bearings in the bars 58, and also in the forwardly bent ends 79 of the rear bar 57. The shaft 78 may be suitably connected to the power shaft of the automobile but I preferably employ the driving sprocket chains of the automobile which may be passed around sprocket wheels 90 arranged on the shaft 78 adjacent its ends.

Instead of employing the driving mechanism just described I may use the one shown in Fig. 18, which latter consists in substituting for the bevel gearing 77, meshing cog gears 91, 92, secured respectively on the shaft 75ᵃ and a parallel longitudinal shaft 93 suitably journaled as shown in said Fig. 18. One end of the shaft 93 is connected by a universal or knuckle joint 94 to a driving shaft 95.

The propeller 3 is of cylindrical form and consists of a series of angle blades 96 spirally arranged and attached to the rims or peripheries 97 of three wheel-like heads which are secured to a transverse shaft 98. The outwardly projecting flanges of the angle metal blades 96 are adapted to enter the snow or ice to prevent slipping and in order to hold the propeller down upon the snow or ice, and also to raise or lower it out of or into contact with the same, I provide means for adjusting the propeller vertically. This adjusting means consists of an inverted U-shaped yoke or hanger 99, the depending ends of which receive the propeller shaft 98, as shown in Fig. 3. The central upper portion of the yoke 99 has secured to it a forked bearing 100 in the arms of which are journaled trunnions 101 formed at opposite points on a forwardly and rearwardly extending cylindrical sleeve 102. The latter slidably receives the cylindrical forward end 103 of a hand lever 104, the rear or handle end of which is arranged within convenient reach of the occupant of the automobile. The lever 104 is fulcrumed intermediate its ends at 105 on a segmental rack 106 secured as shown in Fig. 4 to an inverted U-shaped upright frame 107 constructed of channel metal and secured on top of the rear bar 9. The lever 104 carries the usual hand-controlled pawl which coacts with the segmental rack 106 whereby said lever may be retained in adjusted position to support the propeller at any desired elevation.

In order to guide the propeller in its vertical movement and prevent it from shifting forwardly and rearwardly in the frame 2, the ends of its shaft 98 is rotated in slide blocks or bearings 108 arranged for vertical movement in the dovetail channeled guide bars 109, as shown in Figs. 3 and 13. The guide bars or members 109 are preferably made vertically adjustable in the side portions of the frame 2 by connecting them by means of bolts 110 to vertical plates 111 formed with a vertical series of openings 112 for the reception of the bolts 110. The plates 111 have their upper and lower ends united by bolts to the upper and lower side bars 5, 6, and their intermediate portions are united by bolts to the diagonal braces 8 so that the frame 2 will be strong and durable. Cups for oil or other lubricant are arranged at 113 on the bearing slides 108 so that the shaft 98 will be properly lubricated. It will be understood that suitable oil cups may also be provided on the bearings for the various shafts, and stop collars may be provided on the shafts for preventing longitudinal movement of the same. Fixed to the propeller shaft 98 are sprocket wheels 114 which are connected by sprocket chains 115 to sprocket wheels 116 fixed to a transverse shaft 117 journaled in bearings on the rear uprights 7 and on the braces 7ᵃ, as shown in Fig. 4. Fixed to the intermediate portion of the shaft 117 is a sprocket wheel 118 which is connected by a sprocket chain 119 to the sprocket wheel of the rotary element or wheel 71, see Fig. 1. In order to maintain the chains 115 taut when the propeller wheel is either in its raised or lowered position I provide the tension devices one of which is clearly shown in Fig. 17. This device comprises a flange roller 120 which receives the chain 115 and is journaled in a yoke 121 attached to the lower end of a coil spring 122, the upper end of which is connected to one of two inclined or angularly arranged braces 123. These braces have their rear ends connected to the part 107, and their forward ends secured in the upper extremities of the channeled guide members or uprights 109, as will be understood on reference to Figs. 1, 3 and 4.

In using the invention the automobile is mounted on the sled 1 by securing its axles in the clamps 64 and connecting its power shaft to the longitudinal shaft of a sled either as indicated in Fig. 1 or in Fig. 18. The occupant or operator of the automobile may then operate the power-controlling mechanism of the automobile so that power will be applied to the propeller 3 for the purpose of moving the device in either a forward or rearward direction and at any desired speed. By adjusting the lever 104 the effectiveness of the propeller 3 may be varied and if desired it may be raised entirely off of the snow or ice. By rotating the screw shaft 29 the front axle 21 may be turned to cause the wheels 4 to steer the device in any desired direction. It will be noted that by reason of the adjustable connections between the front end of the frame 2 and the reach 12 and the adjustable connection between the rear end of the frame 2 and the sled 1, said frame 2 may be positioned at any desired elevation so that machines will meet the conditions of roads, whether smooth or filled with ruts.

From the foregoing it will be seen that the invention provides an exceedingly simple, strong and durable device which will permit an automobile or motor-vehicle to be effectively used on snow and ice, and that owing to the peculiar construction the automobile may be readily applied to and removed from the device without altering the construction of the former.

While the preferred embodiment of the invention has been shown and described in detail, it will be understood that I do not wish to be limited to the precise construction set forth, since various changes in the form, proportion and arrangement of parts, and in the details of construction, may be resorted to within the spirit and scope of the invention.

Having thus described the invention, what is claimed is:

1. The combination of a sleigh having a body supported by spaced runners, means on said sleigh body to receive the axles of a motor vehicle and support the same, a frame arranged in advance of the sleigh and having its rear end supported by the latter, a reach at the front end of the frame, a front axle pivoted to said reach, supporting and steering wheels on said axle, a steering mechanism for said wheels mounted on the frame and having an actuating element within reach of the operator of the motor vehicle, a propeller in said frame, means for raising and lowering said propeller, the last mentioned means being under the control of the motor vehicle, and gearing for driving said propeller arranged in the frame and in the body portion of the sleigh and adapted to be driven from the power mechanism of the motor vehicle.

2. The combination of a sleigh, means for supporting a motor vehicle on said sleigh, gearing arranged on the sleigh and driven from the power mechanism of said motor vehicle, a frame arranged in advance of the sleigh and having its rear end supported by the latter, steering wheels for supporting the front end of said frame, a steering mechanism for controlling said wheels arranged on the frame and having an actuated element within reach of the operator of the motor vehicle, a propeller arranged in said frame, means for actuating said propeller, the last mentioned means being within control of the operator of the motor vehicle, and gearing arranged in said frame and driven by the gearing on said sleigh for rotating said propeller.

3. The combination of a sleigh, means thereon for supporting a motor-vehicle, a longitudinal shaft journaled in the sleigh and adapted to be driven from the power mechanism of the motor-vehicle, a transverse rod at one end of the sleigh, a rotary element on said rod and driven from said longitudinal shaft, a frame having one end supported from said rod, a supporting and steering device for the other end of said frame, a propeller in said frame, and means for imparting the rotary movement of said element to said propeller.

4. The combination of a sleigh, means thereon for supporting a motor-vehicle, a frame having one end supported by said sleigh, a propeller in said frame and actuated from the power mechanism of the motor vehicle, a reach angularly adjustable in the vertical plane at the other end of said frame, an axle pivoted to said reach, supporting and steering wheels on said axle, and means for controlling said axle.

5. The combination of a sleigh, means thereon for supporting a motor-vehicle, a frame, and means for vertically adjusting the rear end of said frame on one end of the sleigh, a supporting and steering device for the front end of the frame, and a propeller in said frame and actuated from the power mechanism of the motor-vehicle.

6. The combination of a sleigh, means thereon for supporting a motor-vehicle, a front axle carrying supporting and steering wheels, a reach on said front axle, a frame vertically adjustable between the reach and one end of said sleigh, and a propeller in said frame and actuated from the power mechanism of the motor-vehicle.

7. The combination of a sleigh, means thereon for supporting a motor-vehicle, a frame connected at one end to the sleigh, a steering device for the other end of the frame, a propeller in said frame and actuated from the power mechanism of the motor-vehicle, and means for raising and lowering said propeller in said frame.

8. The combination of a sleigh, means thereon for supporting a motor-vehicle, a frame connected at one end to the sleigh, a steering device for the other end of the frame, a propeller wheel in said frame, vertically slidable bearings for the shaft of said propeller wheel, guides on said frame for said bearings, a yoke suspending the shaft of the propeller wheel, a bifurcated bracket on said yoke, a sleeve having trunnions rotatable in the arms of said bifurcated bracket, a lever having one end slidable in said sleeve, a locking means for said lever, and means for actuating the propeller shaft from the power mechanism of the motor-vehicle.

9. The combination of a sleigh, means thereon for supporting a motor-vehicle, a frame arranged in advance of the sleigh and having its rear end supported by the latter, a pivoted axle at the front end of the frame, supporting and steering wheels on said axle, a propeller in said frame actuated from the power mechanism of the motor-vehicle, a diagonally arranged lever pivoted at its center along the forward portion of the frame, operative connections between the ends of said lever and the end portions of the axle, a bell crank on the frame and having one arm connected to one end of said lever, and means for actuating the other arm of said bell crank.

10. The combination of a sleigh, means thereon for supporting a motor-vehicle, a frame arranged in advance of the sleigh and having its rear end supported by the latter, a pivoted axle at the front end of the frame, supporting and steering wheels on said axle, a propeller in said frame actuated from the power mechanism of the motor-vehicle, a diagonally arranged lever pivoted at its center along the forward portion of the frame, operative connections between the ends of said lever and the end portions of the axle, a bell crank on the frame and having one arm connected to one end of said lever, a screw shaft mounted on the frame, and a link connected at one end to the other arm of the bell crank and having its other arm swiveled to one end of said screw shaft.

11. The combination of a sleigh, means thereon for supporting a motor-vehicle, a frame arranged in advance of the sleigh and having its rear end supported by the latter, a pivoted axle at the front end of the frame, supporting and steering wheels on said axle, a propeller in said frame actuated from the power mechanism of the motor-vehicle, a diagonally arranged lever pivoted at its center along the forward portion of the frame, operative connections between the ends of said lever and the end portions of the axle, cushioning or tension devices included in said connections, a bell crank on the frame, a link connecting one arm of the bell crank to one arm of the lever, and means for actuating the other arm of the bell crank.

In testimony whereof I hereunto affix my signature in the presence of two witnesses.

GUY DOKTER.

Witnesses:
 J. VANDER MEIDE,
 OSCAR BELDEN.